(12) United States Patent
Wong (10) Patent No.: US 7,346,617 B2
(45) Date of Patent: Mar. 18, 2008

(54) MULTI-TABLE ACCESS CONTROL

(75) Inventor: Daniel Manhung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 413 days.

(21) Appl. No.: 10/764,180

(22) Filed: Jan. 23, 2004

(65) Prior Publication Data

US 2005/0165799 A1 Jul. 28, 2005

(51) Int. Cl.
*G06F 17/30* (2006.01)
*G06F 12/00* (2006.01)

(52) U.S. Cl. .............. 707/9; 711/163; 726/27; 726/28; 726/29; 726/30

(58) Field of Classification Search ............ 707/9, 707/2, 4; 711/163; 726/1, 27–30
See application file for complete search history.

(56) References Cited

U.S. PATENT DOCUMENTS

| | | | |
|---|---|---|---|
| 5,335,346 A * | 8/1994 | Fabbio | 711/163 |
| 5,721,848 A | 2/1998 | Joseph | |
| 5,819,251 A | 10/1998 | Kremer et al. | |
| 5,832,226 A | 11/1998 | Suzuki et al. | |
| 5,850,507 A | 12/1998 | Ngai et al. | |
| 5,860,144 A | 1/1999 | Frank et al. | |
| 5,864,842 A * | 1/1999 | Pederson et al. | 707/3 |
| 5,873,106 A | 2/1999 | Joseph | |
| 5,893,166 A | 4/1999 | Frank et al. | |
| 5,918,236 A | 6/1999 | Wical | |
| 6,006,234 A | 12/1999 | Govindarajan et al. | |
| 6,014,656 A | 1/2000 | Hallmark et al. | |
| 6,058,389 A | 5/2000 | Chandra et al. | |
| 6,112,226 A | 8/2000 | Weaver et al. | |
| 6,119,154 A | 9/2000 | Weaver et al. | |
| 6,138,147 A | 10/2000 | Weaver et al. | |
| 6,173,313 B1 | 1/2001 | Klots et al. | |
| 6,182,241 B1 | 1/2001 | Ngai et al. | |
| 6,226,649 B1 | 5/2001 | Bodamer et al. | |
| 6,275,825 B1 | 8/2001 | Kobayashi et al. | |
| 6,334,128 B1 | 12/2001 | Norcott et al. | |
| 6,405,212 B1 | 6/2002 | Samu et al. | |
| 6,405,274 B1 | 6/2002 | Chan | |

(Continued)

OTHER PUBLICATIONS

Oracle Corporation, "Summary of Subprograms," Oracle8*i* Supplied PL/SQL Packages Reference, Release 2 (8.1.6), Part No. A76936-01, 1996-2000, http://download-west.oracle.com/docs/cd/A87860_01/doc/appdev.817/a76936/dbhms_rl2, data retrieved Dec. 18, 2003, pp. 1-7.

(Continued)

*Primary Examiner*—Apu Mofiz
*Assistant Examiner*—CamLinh Nguyen
(74) *Attorney, Agent, or Firm*—Hickman Palermo Truong & Becker LLP (57) ABSTRACT

Multi-table access control is disclosed that limits access to tables when a requirement for access to multiple columns is detected, where the multiple columns includes at least one column from one table and another column from another table. In an embodiment, the detection of the requirement for access to multiple columns triggers a policy to rewrite the query to include a condition expression that limits access to the multiple columns to those that are entitled to access.

12 Claims, 2 Drawing Sheets

U.S. PATENT DOCUMENTS

| | | | |
|---|---|---|---|
| 6,449,609 B1* | 9/2002 | Witkowski | 707/4 |
| 6,460,052 B1 | 10/2002 | Thomas et al. | |
| 6,470,344 B1 | 10/2002 | Kothuri et al. | |
| 6,484,179 B1 | 11/2002 | Roccaforte | |
| 6,484,180 B1 | 11/2002 | Lyons et al. | |
| 6,487,552 B1* | 11/2002 | Lei et al. | 707/4 |
| 6,510,504 B2 | 1/2003 | Satyanarayanan | |
| 6,516,317 B1 | 2/2003 | Samar et al. | |
| 6,529,906 B1 | 3/2003 | Chan | |
| 6,549,916 B1 | 4/2003 | Sedlar | |
| 6,564,203 B1 | 5/2003 | Krishnaprasad et al. | |
| 6,574,654 B1 | 6/2003 | Simmons et al. | |
| 6,578,037 B1 | 6/2003 | Wong et al. | |
| 6,587,854 B1 | 7/2003 | Guthrie et al. | |
| 6,604,182 B1 | 8/2003 | Sexton et al. | |
| 6,606,627 B1 | 8/2003 | Guthrie et al. | |
| 6,615,223 B1 | 9/2003 | Shih et al. | |
| 6,618,744 B1 | 9/2003 | Simmons et al. | |
| 6,631,371 B1 | 10/2003 | Lei et al. | |
| 6,636,870 B2 | 10/2003 | Roccaforte | |
| 6,668,270 B1 | 12/2003 | Simmons et al. | |
| 6,668,295 B1 | 12/2003 | Chan | |
| 6,678,676 B2 | 1/2004 | Brickell et al. | |
| 6,704,767 B1 | 3/2004 | Simmons et al. | |
| 6,708,198 B1 | 3/2004 | Simmons et al. | |
| 6,715,146 B1 | 3/2004 | Simmons et al. | |
| 6,745,332 B1 | 6/2004 | Wong et al. | |
| 6,996,557 B1* | 2/2006 | Leung et al. | 707/4 |
| 7,117,197 B1 | 10/2006 | Wong et al. | |
| 2002/0194211 A1 | 12/2002 | Subramanian et al. | |
| 2003/0014394 A1* | 1/2003 | Fujiwara et al. | 707/3 |
| 2003/0055832 A1 | 3/2003 | Roccaforte | |
| 2003/0065659 A1 | 4/2003 | Agrawal et al. | |
| 2003/0200197 A1 | 10/2003 | Long et al. | |
| 2003/0208503 A1 | 11/2003 | Roccaforte | |
| 2003/0236781 A1 | 12/2003 | Lei et al. | |
| 2003/0236782 A1 | 12/2003 | Wong et al. | |
| 2004/0054933 A1 | 3/2004 | Wong et al. | |
| 2004/0088340 A1 | 5/2004 | Idicula et al. | |
| 2004/0254948 A1 | 12/2004 | Yao | |

OTHER PUBLICATIONS

Oracle Corporation, "Summary of DBMS_FGA Subprograms," Oracle9i Supplied PL/SQL Packages and Types Reference, Release 2 (9.2), Part No. A96612-01, 2000, 2002, http://download-west.oracle.com/docs/cd/B10501_01/appdev.920/a96612/d_fga2, data retrieved Dec. 18, 2003, pp. 1-4.

Oracle Corporation, "Accessing a Workplace from OLAP Worksheet," Oracle9i OLAP Developer's Guide to the OLAP DML, Release 2 (9.2), Part No. A95298-01, 2001, 2002, http://download-west.oracle.com/docs/cd/B10501_01/olap.920/a95298/basics4.htm_-_1006174, data retrieved Dec. 19, 2003, pp. 1-4.

Oracle Corporation, "Advanced Topics," Pro*C/C++ Precompiler Programmer's Guide, Release 9.2, Part No. A97269-01, 1996, 2002, http://download-west.oracle.com/docs/cd/B10501_01/appdev.920/a97269/pc_05adv.htm, data retrieved Dec. 19, 2003, pp. 1-48.

Oracle Corporation, "Basic Concepts," Oracle9i Reports Building Reports, Release 9.0, Part No. B10310-01, 2002, http://otn.oracle.com/products/reports/htdocs/getstart/docs/b10310_01/orbr_concepts1.htm, data retrieved Dec. 19, 2003, pp. 1-43.

Oracle Corporation, "Privileges, Roles, and Security Policies," Oracle9i Database Concepts, Release 2 (9.2), Part No. A96524-01, 1996, 2002, http://download-west.oracle.com/docs/cd/B10501_01/server.920/a96524/c24privs.htm, data retrieved Dec. 18, 2003, pp. 1-22.

Oracle Corporation, "Implementing Application Security Policies," Oracle9i Application Developer's Guide—Fundamentals, Release 2 (9.2), Part No. A96590-01, 1996, 2002, http://download-west.oracle.com/docs/cd/B10501_01/appdev.920/a96590/adgsec02.htm, data retrieved Dec. 18, 2003, pp. 1-49.

* cited by examiner

MULTI-TABLE ACCESS CONTROL

FIELD OF THE INVENTION

The invention relates to computer security in general. More specifically, the invention relates to security policies for accessing databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, whether or not a given approach is prior art, the problems identified with that approach should not be assumed to have been recognized in the prior art.

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field. The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A database server retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of the present invention are illustrated using queries.

One function of a database server is to control access to database data. Security mechanisms on database servers control what data may be accessed by a query issued by a user. One type of security mechanism is referred to as a fine-grained access control mechanism. An example of fine-grained access control is described in U.S. Pat. No. 6,487,552, issued Nov. 26, 2002 to Chon Hei Lei et al, which is incorporated herein by reference in its entirety. Fine-grained access control may be used to grant and/or deny access to one or more rows of a table.

According to an embodiment of Chon Hei Lei et al. a mechanism is provided for dynamically attaching predicates to queries, where the predicates are attached based on a policy. For example, the database system detects that a query is issued against a database object. Prior to executing the query, a policy function associated with the database object is invoked. The policy function creates a modified query by selectively adding zero or more predicates to the query based on a policy associated with the database object. The modified query is then executed.

For example, an executive may want to see a list of employee names and their salaries available in an employee_name column and employee_salary column of an EMPLOYEE table. Consequently, the executive may submit the query SELECT employee_name, employee_salary FROM employee;

However, the executive may only be entitled to view the information in the EMPLOYEE table that pertains to employees within his department. Consequently, (without notifying or alerting the user) a predicate may be appended to the query, such as WHERE department=My_department(USER_ID)

Effectively, the resulting modified query becomes

SELECT employee_name, employee_salary FROM employee

WHERE department=My_department(USER_ID);

The modified query returns only the names and salaries of the employees within the executives department in accordance with the security policy.

Data in some database objects is valuable when combined with data in another object. For example, in a data warehouse environment, fact tables are combined with dimension tables for analyzing customer data. In payroll, salary information is only meaningful when an employee ID can be traced to an employee's name. In contrast, today's fine-grained access control technology applies policies on a per table basis. Consequently, the simplest way to protect the viewing of the combined information is to prevent the user from viewing either table. However, limiting the access on a per table basis greatly limits what kind of security policies can be enforced at an application level.

Based on the forgoing, it is desirable to provide a more flexible method of protecting information derived from multiple tables.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for multi-table access control is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Introduction

A multi-table access control allows an administrator to specify multi-table policies. A query is rewritten if a particular combination of columns from multiple tables is included within the tables the query requires access. For example, a policy may be established in which a query submitted by a particular user, e.g. Scott, is allowed to access column A from table X, and a different query submitted by Scott is also allowed to access column B from table Y. However, if Scott attempts to access both column A of table X and column B of table Y using the same query, access will be denied.

Fine-Grained Access Control Mechanism

Figure 1:
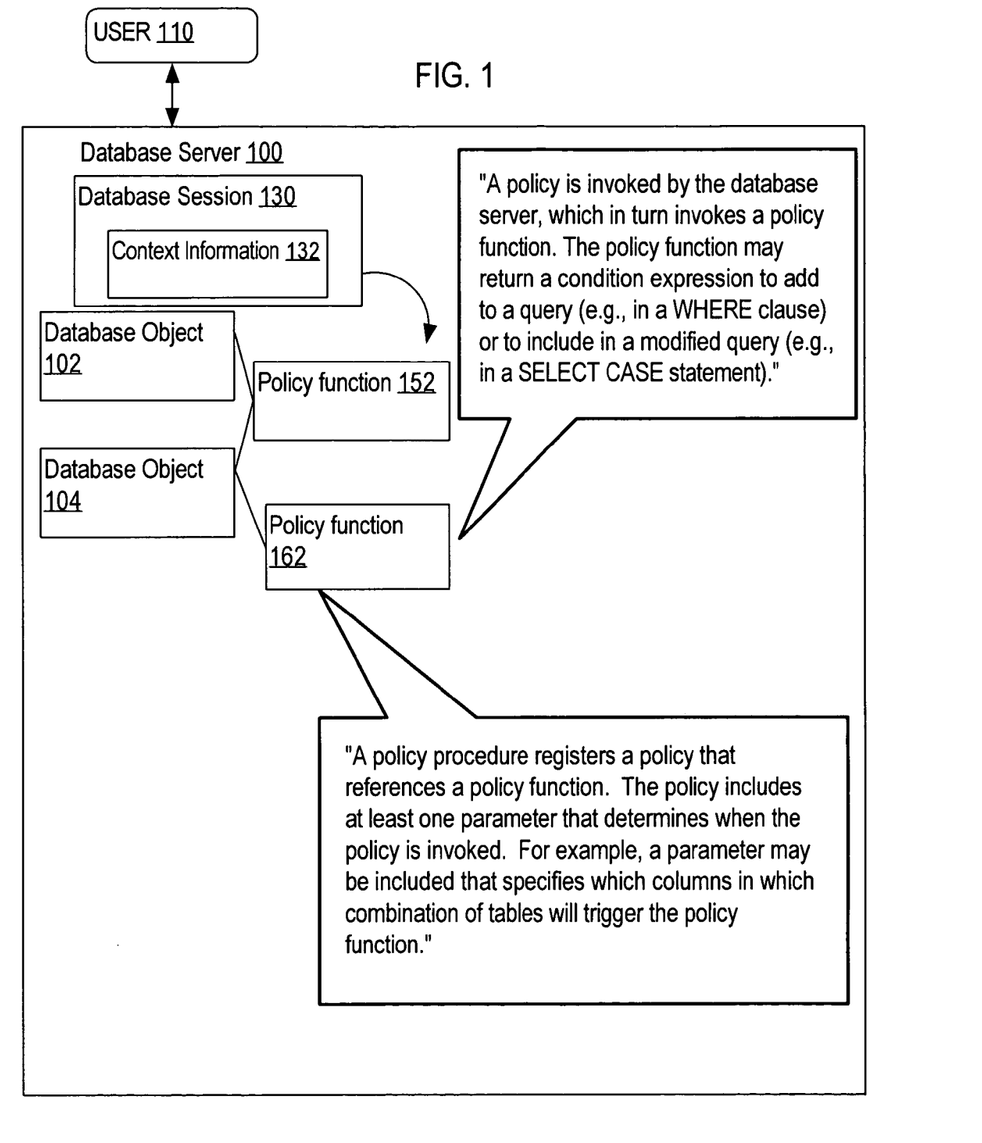
FIG. 1 shows a database server and components used by a fine-grained access control mechanism on the database server, upon which an embodiment of the present invention may be implemented.

FIG. 1 shows a database server 100 and components used by a fine-grained access control mechanism on the database server, upon which an embodiment of the present invention may be implemented. FIG. 1 shows database server 100, which manages access to database objects. A database object may be, for example, a relational or object table, or a view. Among these database objects are database object 102 and database object 104.

User 110 interacts with database server 100 by issuing queries. The results of the queries are computed by database server 100 and returned to user 110. A user may be any type of database client, including one or more processes running on the same or a different computer system as database server 100, and one or more processes executing an application program interface (API) or a user interface through which a user interacts to issue queries.

When user 110 connects to database server 110, a database session 130 is established. If user 110 disconnects from database server 110 and later reconnects to database server 110, a new session is established. A session, such as database session 130, is a particular connection established for a user, such as an application or another database server, through which a series of requests may be made. The requests are carried out by one or more session processes. The requests, which may be in the form of a function or remote procedure invocations, include requests to execute queries, to begin execution of a transaction, to perform updates and other types of transaction operations, to commit or otherwise terminate a transaction, and to terminate a database session.

The database server 130, on which a database session 132 is established, maintains session state data that reflects the current state of database session 132. Among this information is user context information, such as user context information 132. The database session 130 includes context information 132. The context information 132 includes information related to the access privileges of user 110 as well as information related to the present database session.

User context information is data that is maintained by database server 100 and that is associated with a user's database session. Users (such as user 110) may also transmit requests to database server 100 to access and change user context information. The ability of a policy function and user to change context information in this way is subject to constraints that are imposed by database server 100 for security purposes. Context information 132 contains various attributes, such as a user id that identifies the user associated with the session.

A fine-grained access control mechanism uses one or more policy functions, such as policy functions 152 and 162, which are associated with a database object (e.g., a table or a view), such as database objects 102 and 104, respectively. The policy function, such as policy function 152 or 162, is invoked, when, for example, a database server (e.g. database server 100) detects that a query is issued against a database object, such as database objects 102 or 104, respectively. The policy function, such as policy function 152 or 162, returns a condition expression. For example, a policy function may return a condition expression that is used by database server 100 as a predicate that is appended to the query to generate a modified query. The predicate restricts access to data according to logic implemented in one or more of the invoked policy functions 152 or 162. In addition, a policy function, such as policy function 152 or 162, can also modify context information associated with a user, such as context information 132, which can affect subsequent database access control. In this way, user access is transparently restricted by transparently modifying queries issued by users, such as user 110, to limit access to data.

To control access to database objects using a fine-grained access control mechanism, a policy function is associated with the database object so that it is invoked for queries that require access to the table. To this end, database server 100 stores metadata that associates database object 104 with both policy function 152 and 162 and database object 102 with only policy function 152.

When registering a policy function, such as policy function 152 or 162, the user (e.g., user 110) supplies information, via parameters of an administrative procedure, about the policy function. The information about the policy function includes, for example, the database object (e.g., database object 102 or 104) associated with the policy function and one or more columns located in one or more tables that the policy function controls access to, as will be described later in greater detail. The term policy refers to a combination of a policy function and metadata, where the metadata describes how the policy function is used to control access to one or more database objects, such as a combination of columns from different tables. Each invocation of the administrative procedure creates (or registers) a policy for the database objects. A policy is referred to as being invoked when the policy function is invoked under conditions defined by the policy.

Functional Overview

A multi-table access control is described that limits the access of combinations of tables. In an embodiment, multi-table access control includes an engine that allows specification of multi-table policies by for example allowing administrative procedures that establish a policy to be based on multiple tables. The multi-table policy invokes a policy function that is based on or associated with multiple tables.

The policy specifies the combination of information (e.g., columns) that will invoke the policy function. In an embodiment, the multi-table access control rewrites a database command in response to detecting that the database command requires access to multiple columns from multiple tables. Specifically, when a particular combination of columns, which may be located in multiple tables and which are specified by the policy, is detected within a database command by the database server (e.g., by a database command engine such as an SQL engine), the access control policy function is invoked (or triggered) to generate a filter condition by rewriting the database command as a modified database command based on the condition expression and the database command originally detected.

Syntax of an Embodiment of a Policy Function

An example of a syntax for a policy function is as follows:
FUNCTION policy_function ( )
  RETURN VARCHAR2
  begin
  Lines of code defining the function.
  .
  .
  .
  end;

In the first line of the above policy function, "policy_function" is the name of the policy function. For example, a policy function named srfA may be created by the statements:
SQL>CREATE OR REPLACE FUNCTION srfA( )
  2 RETURN VARCHAR2 AS
  3 begin
  4 return 'schema_name1.table_name1.deptno>=100 and schema_name2.table_name2.deptno>=100';
  5 end srfA;
  6 /

In the above example, the first line assigns the name srfA to the policy function. Line 4 returns a condition expression of schema_name1.table_name1.deptno>=100 and schema_name2.table_name2.deptno>=100. In the above condition expression, deptno is the name of the column to which the condition expression is applied, table_name1 and table_name2 are the name of the tables within which a column by the name of deptno is found, and schema_name1 and schema_name2 are the name of the schema that own the tables table_name1 and table_name2, respectively. In this embodiment, the condition expression indicates which tables and schemas the column to which the condition expression can be found.

An Example of a Procedure for Registering a Policy Function

An example of a syntax for an application interface for a procedure for registering a policy function is
  add_policy('<list of table names>', <policy name>, <policy schema>,<policy function>, <sql type>,<column list>, . . . );
In the above statement, '<list of table names>' represents a list of names a combination of tables to which access is limited. In an embodiment, the list of table names is schema qualified. For example, the table HR may be in a schema having the name APPS. Consequently, the HR table would be referred to in the list of tables as APPS.HR. Similarly, the table PAYROLL may be under a schema having the name FINANCE. Consequently, the PAYROLL table would be referred to in the list of tables as FINANCE.PAYROLL. A query requiring access to the combination of tables listed in the <list of table names> may restricted from accessing certain combinations of columns in those tables.

The value of <policy name> is the name of the policy that is triggered.

The value of <policy_function> is the name of a policy function that is invoked once the policy is triggered by the combination of columns from multiple tables listed in '<list of tables with columns in brackets>' of the policy.

The value of <sql type> is a type of SQL statement (e.g., the SELECT statement) to which the policy is applied.

The <column list> is a list of the name of each column in the combination of columns that trigger the policy. The name of each column in the list may include the name of the table to which the column belongs. For example, each column in the list may be enclosed in brackets and preceded by the name of the table to which the column belongs. When a user sends a query in which the combination of columns includes at least the columns listed, the security policy is triggered.

In an embodiment, the <list of table names> may include one or more tables for which no column is listed in the list of columns, which thereby indicates that if access is required to any column in those tables the policy is invoked. Similarly, if one or more tables are specified in the <list of table names>, but no column is specified (e.g., the <column list> is empty), then as long as any of those tables are referenced, regardless of the whether the database statement requires access to any of the columns of the table (e.g., as indicated by the absence or presence of references to those columns in the database statement) the multi-table policy is triggered.

In another embodiment, only when a database requires access to all of the columns the policy is triggered. In yet a third embodiment, the user can specify which criterion will trigger the policy. For example, a setting may be provided via an input parameter such as an optional argument or other input parameter, e.g., having values of ALL or ANY, that the administrator may set and thereby choose whether the policy is triggered by the database statement requiring access to all of the columns in the <column list> or whether the policy is triggered only by the database statement requiring access to any of the columns in the <column list>, respectively. The default may be that (unless the administrator chooses otherwise) the policy is triggered by the database requiring access to any of the columns in the <column list>.

An example of an application of this syntax is
  add_policy('apps.hr,finance.payroll','privacy_policy', 'security.policy_function1','select','apps.hr(deptno), finance.payroll(deptno)');

This add_policy statement states that the security policy specified by security.policy_function1 is invoked when a database statement (e.g., an SQL statement) references the deptno column from the HR table and the deptno column from the PAYROLL table column, where the HR table belongs to the APPS schema and the PAYROLL table belongs to the FINANCE schema. In this statement the SQL type has the value 'select'. In SQL, the reference to the columns that invokes the security policy may occur in the SELECT clause, for example. In an embodiment, when policy_function1 is executed, a filter condition is generated that is applied to the originating database statement. In alternative embodiments, the add_policy procedure may not have all of the parameters listed above or may have other parameters in addition to or instead of those listed above.

EXAMPLE

Assume that a schema exists for a user by the name of Scott having, and that a database includes the following two tables

HR

| DEPTNO | EMPLOYEE_ID | EMPLOYEE_NAME |
|---|---|---|
| 100 | 1WX3 | Scott Buyers |
| 41 | H4R | Bill Jones |
| 10 | ICU | Thomas Peet |
| 15 | UCUS | Gregory Adams |

PAYROLL

| DEPTNO | EMPLOYEE_ID | SALARY |
|---|---|---|
| 100 | 1WX3 | $10,000 |
| 41 | H4R | $100,000 |
| 10 | ICU | $5,000 |
| 15 | UCUS | $2,000,000 |

If the administrator would like to establish a policy for the HR and PAYROLL tables, the administrator needs to also establish at least one policy function for use by the policy. Assume that there exists a function my_deptno(user_id), which when a user_id is entered the deptno corresponding to the that user is returned. Using the my_deptno( ) function the administrator may establish a policy function for the HR and PAYROLL tables by entering the following lines.

SQL>CREATE OR REPLACE FUNCTION policy_function1( )
  2 RETURN VARCHAR2 AS
  3 begin
  4                                                                    return
    'APPS.HR.deptno=FINANCE.PAYROLL.deptno and FINANCE.PAYROLL.deptno=my_deptno(user_id)';
  5 end policy_function1;
  6 /

The above lines create a policy function having the function_name policy_function1, which returns the condition expressions
APPS.HR.deptno=FINANCE.PAYROLL.deptno and FINANCE.PAYROLL.deptno=my_deptno(user_id). The two condition expressions combined limit Scott's access to both the PAYROLL and HR tables to Scott's deptno.

To establish a policy that uses the policy function policy_function1, the following lines may also be entered by the administrator.
SQL>add_policy('apps.hr,finance.payroll','privacy_policy','security.policy_function1','select','apps.hr(employee_name),finance.payroll(salary)');

This is the same add_policy procedure as in the earlier example.

Also assume that Scott has a department number given by deptno=100, and that with the privacy_policy policy enabled Scott submits the following query.
SELECT H.employee_name P.salary FROM HR H, PAYROLL P
WHERE (H.employee_id=P.employee_id);

This query uses the columns employee_id from the HR and PAYROLL table as a join key to join the HR with the PAYROLL table. The privacy_policy policy, registered by the above add_policy procedure, is triggered by the combination of references to the columns employee_name and employee_id from the HR table and the columns salary and employee_id from the PAYROLL table. In response to the above query the database server rewrites the query as SELECT H.employee_name P.salary FROM HR H, PAYROLL P
WHERE (h.employee_id=p.employee_id AND h.deptno=my_deptno(userid));

This modified query returns one row, which is

| DEPTNO | SALARY | EMPLOYEE_NAME |
|---|---|---|
| 100 | $10,000 | Scott Buyers |

The predicate added to the WHERE clause limits Scott's access to only his department number, because the salary and employee_id columns were requested from the PAYROLL table and the employee_id and employee_name were requested from the SALES column. Even though the policy function returns 'apps.hr.deptno . . . ', when rewriting the query, the string is modified to match the alias in use, which in this case it is 'h'.

In contrast, the privacy_policy policy would not have been invoked had Scott submitted the query
SELECT employee_id, employee_name FROM HR;

In response to this query, because the combination of columns and tables specified in the privacy_policy policy was not specified, the above query is not modified, and the database server would have returned

HR

| EMPLOYEE_ID | EMPLOYEE_NAME |
|---|---|
| 1WX3 | Scott Buyers |
| H4R | Bill Jones |
| ICU | Thomas Peet |
| UCUS | Gregory Adams |

Similarly, the privacy_policy policy would not have been invoked had Scott submitted the query
SELECT employee_id, salary FROM PAYROLL;

In response to this query, because the combination of columns and tables specified in the privacy_policy policy was not specified, the query is not modified, and the database server would have returned

PAYROLL

| EMPLOYEE_ID | SALARY |
|---|---|
| 1WX3 | $10,000 |
| H4R | $100,000 |
| ICU | $5,000 |
| UCUS | $2,000,000 |

Alternative Embodiments

The invention is not limited to any particular syntax, and may be implemented using a variety of syntaxes for the add_policy procedure. For example, in an alternative embodiment, the syntax for the add_policy procedure may be add_policy('apps.hr(employee_name),finance.payroll (salary),
payroll(employee_id)','privacy_policy',
'policy_function1','select');

In this embodiment, the column names are embedded in the tables names of the list of tables.

As an example of another embodiment, the syntax for the add_policy procedure may be add_policy('apps.hr(employee_id,employee_name),finance.payroll(salary,employee_id)','privacy_policy',
'policy_function1','select',dynamic);

In this embodiment, a list of zero or more columns is embedded within each table name. Instead of each table being followed by none or one column enclosed in brackets, each table is followed by a list of zero or more columns from that table. In alternative embodiments, rather than using one policy function for multiple tables, a different policy function may be established for each table, and the add_policy procedure may include input parameters for specifying multiple policy functions. In this embodiment, the same condition expression is applied to multiple tables by having different policy functions (one for each table of interest) that include the same condition expression.

Hardware Overview

Figure 2:
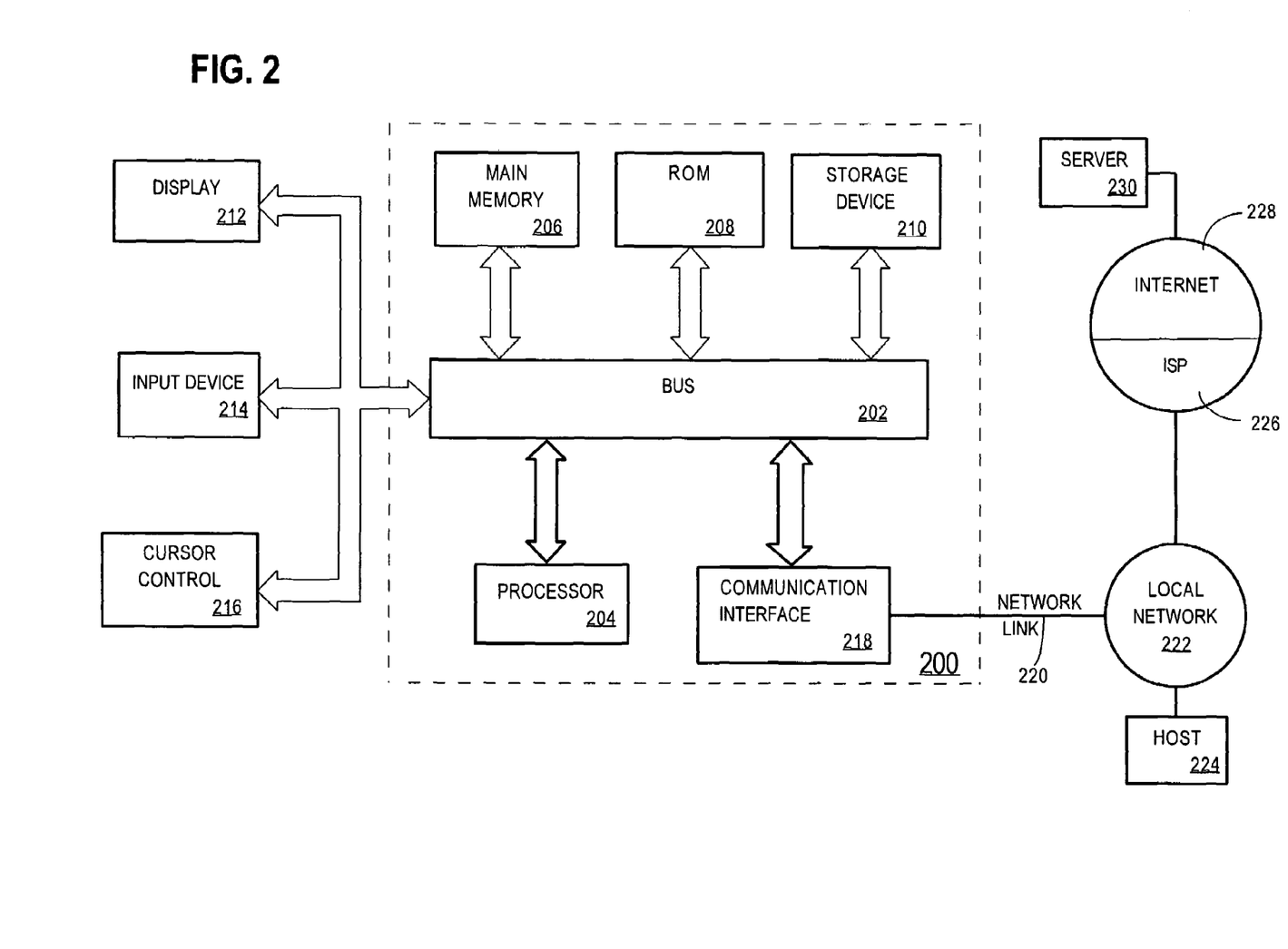
FIG. 2 is a block diagram that illustrates a computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. In an embodiment, client-side 102 and/or server-side 110 may reside on a machine such as computer system 200. In an embodiment, database 118 may be a machine such as computer system 200. According to one embodiment of the invention, the techniques described herein are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. The computer-readable medium is just one example of a machine-readable medium, which may carry instructions for implementing any of the methods and/or techniques (e.g., method 500) described herein. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for managing access to data, the method comprising the steps of:
    registering with a database server a user defined policy function to associate with at least two columns of two tables;
    wherein registering causes said database server to generate database metadata that associates said policy function with said at least two columns of two tables;
    based on the metadata, said database server detecting that a query references said at least two columns; and
    in response to the step of detecting:
        said database server invoking said policy function to generate a condition expression returned by the policy function; and
        rewriting said query by creating a modified query to incorporate said condition expression, based on the database query.

2. The method of claim 1, wherein the policy function is not invoked by detecting that a database command requires access to a subset of tables of the at least two tables, wherein the subset of tables includes at least one table.

3. The method of claim 1, wherein the detecting includes detecting that metadata defines the columns as a combination of columns to which access is controlled.

4. The method of claim 1, further comprising the step of registering a policy function with a policy.

5. The method of claim 4, wherein the policy includes metadata identifying the columns.

6. The method of claim 1, wherein a join predicate in said query references both of said at least two columns.

7. A machine-readable medium carrying one or more sequences of instructions, which when executed by one or more processors, causes the one or more processors to perform a method comprising the steps of:
    registering with a database server a user defined policy function to associate with at least two columns of two tables;
    wherein registering causes said database server to generate database metadata that associates said policy function with said at least two columns of two tables;
    based on the metadata, said database server detecting that a query references at least two columns; and
    in response to the step of detecting:
        said database server invoking said policy to a generate of a condition expression returned by the policy function; and
        rewriting said query by creating a modified query to incorporate said condition expression, based on the database query.

8. The machine readable medium of claim 7, wherein the policy function is not invoked by detecting that a database command requires access to a subset of tables of the at least two tables, wherein the subset of tables includes at least one table.

9. The machine readable medium of claim 7, wherein the detecting includes detecting that metadata defines the columns as a combination of columns to which access is controlled.

10. The machine readable medium of claim 7, wherein the method further comprises the step of registering a policy function with a policy.

11. The machine readable medium of claim 10, wherein the policy includes metadata identifying the columns.

12. The machine readable medium of claim 7, wherein a join predicate in said query references both said at least two columns.

* * * * *

UNITED STATES PATENT AND TRADEMARK OFFICE
CERTIFICATE OF CORRECTION

| | |
|---|---|
| PATENT NO. | : 7,346,617 B2 |
| APPLICATION NO. | : 10/764180 |
| DATED | : March 18, 2008 |
| INVENTOR(S) | : Wong |

It is certified that error appears in the above-identified patent and that said Letters Patent is hereby corrected as shown below:

In column 8, line 12, delete "(userid));" and insert -- (user_id)); --, therefor.

Signed and Sealed this

Twenty-seventh Day of October, 2009

David J. Kappos
*Director of the United States Patent and Trademark Office*